US 7,552,109 B2

(12) United States Patent
Balasubramanian et al.

(10) Patent No.: US 7,552,109 B2
(45) Date of Patent: Jun. 23, 2009

(54) SYSTEM, METHOD, AND SERVICE FOR COLLABORATIVE FOCUSED CRAWLING OF DOCUMENTS ON A NETWORK

(75) Inventors: Srinivasan Balasubramanian, San Jose, CA (US); Laurent Chavet, Kirkland, WA (US); Runping Qi, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 10/686,964

(22) Filed: Oct. 15, 2003

(65) Prior Publication Data

US 2005/0086206 A1   Apr. 21, 2005

(51) Int. Cl.
*G06F 17/30* (2006.01)
(52) U.S. Cl. .................. 707/3; 707/4; 707/5; 707/6
(58) Field of Classification Search .............. 707/5, 707/3, 4, 6; 709/201
See application file for complete search history.

(56) References Cited

U.S. PATENT DOCUMENTS

| | | | | |
|---|---|---|---|---|
| 6,199,081 B1* | 3/2001 | Meyerzon et al. | ........... | 715/513 |
| 6,295,559 B1* | 9/2001 | Emens et al. | ........... | 709/225 |
| 6,418,433 B1* | 7/2002 | Chakrabarti et al. | ........... | 707/5 |
| 6,691,108 B2* | 2/2004 | Li | ............. | 707/3 |
| 6,754,873 B1* | 6/2004 | Law et al. | ........... | 715/501.1 |
| 6,993,534 B2* | 1/2006 | Denesuk et al. | ........... | 707/102 |
| 7,080,073 B1* | 7/2006 | Jiang et al. | ........... | 707/7 |
| 7,085,753 B2* | 8/2006 | Weiss et al. | ........... | 707/2 |
| 2001/0044818 A1* | 11/2001 | Liang | ........... | 709/201 |
| 2002/0032869 A1* | 3/2002 | Lamberton et al. | ........... | 713/200 |
| 2002/0194161 A1* | 12/2002 | McNamee et al. | ........... | 707/2 |
| 2004/0049514 A1* | 3/2004 | Burkov | ........... | 707/100 |
| 2006/0277175 A1* | 12/2006 | Jiang et al. | ........... | 707/5 |

OTHER PUBLICATIONS

Article entitled "Mercator: A Scalable, Extensible Web Crawler", dated Jun. 26, 1999, by Heydon et al.*

(Continued)

*Primary Examiner*—Tim T. Vo
*Assistant Examiner*—Mahesh H Dwivedi
(74) *Attorney, Agent, or Firm*—Cantor Colburn LLP; Brian Lambert (57) ABSTRACT

A collaborative focused crawler crawls documents on a network locating documents that match multiple focus topics. The collaborative crawler comprises a fetcher and a focus engine. The fetcher prioritizes which documents to crawl based on a set of rules, obtains documents from the network, and outputs crawled documents to the focus engine. The focus engine determines whether a fetched document is relevant to any of the multiple focus topics. The focus engine determines whether fetched documents are disallowed. If a fetched document is disallowed, the present system may place the URL for that web document in a blacklist, a list of URLs that may not be crawled. URLs may be disallowed if they match a disallowed topic or if they fail a set of rules designed for a web space focus, for example, domain rules, IP address rules, and prefix rules.

8 Claims, 9 Drawing Sheets

OTHER PUBLICATIONS

R. Ghani, et al., "Relevance feedback rather than actually web mining," available at http://www.cs.nyu.edu/courses/fall02/g22.3033-008/lec10.html, on Aug. 28, 2003.

S. Chakrabarti, "Focussed Crawling," available at http://www.cs.Berkeley.edu/~soumen/focus/ on Aug. 28, 2003.

P. Perry, "Personal Search Crawlers," available at http://www.paulperry.net/notes/search.asp on Aug. 28, 2003.

C. Aggarwal, et al., "Intelligent Crawling on the World Wide Web With Aebitrary Predicares," available at http://www.10.org/cdrom/papers/110/ on Aug. 28, 2003.

"Website Promotion Scientific," available at http://www.ranks.nl/resources/scientific.html on Aug. 28, 2003.

CSIRO—HAIL seminars—Abstract available at http://www.cmis.csiro.au/conferences-seminars/hail/abstracts/2000-past/DavidHawking.htm on Aug. 28, 2003.

"Smider the Smart spIDER," available at http://frank.spieleck.de/metasuch/ on Aug. 28, 2003.

"The Homepage of Christopher James," available at http://www.csee.umbc.edu/~cjames2/Research.htm on Aug. 28, 2003.

* cited by examiner

SYSTEM, METHOD, AND SERVICE FOR COLLABORATIVE FOCUSED CRAWLING OF DOCUMENTS ON A NETWORK

FIELD OF THE INVENTION

The present invention generally relates to crawling a network for documents related to a specific topic, and more particularly to a method for collaboratively crawling a network for multiple documents while accessing each page or document only once per crawling session.

BACKGROUND OF THE INVENTION

The World Wide Web (WWW) is comprised of an expansive network of interconnected computers upon which businesses, governments, groups, and individuals throughout the world maintain inter-linked computer files known as web documents. Users navigate these web documents by means of computer software programs commonly known as Internet browsers. Due to the vast number of WWW sites, many web documents have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

A typical search engine has an interface with a search window where the user enters an alphanumeric search expression or keywords. The search engine sifts through available web sites for the user's search terms, and returns the search of results in the form of HTML documents. Each search result comprises a list of individual entries that have been identified by the search engine as satisfying the user's search expression. Each entry or "hit" may comprise a hyperlink that points to a Uniform Resource Locator (URL) location or web document. Examples of currently popular search engines are Google and Alta Vista.

The authors of web documents provide information known as metadata within the body of the hypertext markup language (HTML) document that defines the web documents. Centralized search engines use software referred to as "web crawlers" or "crawlers" to continuously access Web documents and construct a centralized keyword index. The crawler systematically accesses web documents by sequentially following hypertext links, or out-links, from document to document. The crawler indexes the web documents for use by the search engines using information about a web document as provided by its address or Universal Resource Locator (URL), metadata, and other criteria found within the web document. The crawler is run periodically to update previously stored data and to append information about newly created web documents. The information compiled by the crawler is stored in a metadata repository or database. The search engines search this repository to identify matches for the user-defined search rather than attempt to find matches in real time.

When a person wishes to retrieve information, the person's browser accesses a centralized search engine using a query, for example, "luxury cars". In response, software at the centralized engine accesses its index to retrieve names of Web sites considered by the search engine to be appropriate sources for the sought-after information. The search engine transmits to the browser hyperlinks to the retrieved sites, along with brief summaries of each site, with the browser presenting the information to the user. The user can then select the site or sites they want by causing the browser to access the site or sites.

Owing to the burgeoning of the Web and the ever-growing amount of its information, centralized crawler/searchers require large investments in hardware and software and should never cease crawling the Web to index new web documents and to periodically revisit old web documents that might have changed. One Web search company currently requires the use of 16 of the most powerful computers made by a major computer manufacturer, each computer having 8 gigabytes of memory. Another search company currently uses a cluster of 300 powerful workstations and over one terabyte of memory to crawl over 10 million Web documents per day.

Despite the resources expended, it is estimated that a single search company is able to index only 30%-40% of the Web, owing to the size and rate of expansion of the Web. Further, the Web shows no signs of slowing its rate of expansion, which is currently at about one million new web documents per day. In addition to the cost of equipment, a conventional crawler wastes bandwidth in a search that locates documents of any type. Bandwidth is very expensive. Further, the equipment used by the crawler has limitations in storage capacity and speed. Crawling every web document regardless of usefulness or interest minimizes the efficiency of the crawler and maximizes the cost to operate the crawler.

Additionally, evaluating whether a particular Web document contains relevant information with respect to a user query is sometimes difficult. Moreover, user queries may not be effectively articulated, or they may be overbroad. Consequently, a Web search engine frequently responds to a query by returning a large number of Web documents that are of little or no interest to the requester. Nonetheless, a user may laboriously sort through hundreds and perhaps thousands of returned Web documents, which, as discussed above, can be considered to represent only 30%-40% of the total Web content in any case. Moreover, because a centralized crawler seeks the capability to respond to any query, most of the index of any single centralized system contains information that is of little or no value to any single user or indeed to any single interrelated group of users.

One solution to a centralized crawler is a focused crawler. A focused crawler crawls the Web searching for documents and pages that match the focus topic. Although this technology has proven to be useful, it would be desirable to present additional improvements. The conventional focused crawler focuses only on one topic.

For a search engine to crawl the Web for multiple focus topics, multiple instances of the focused crawler should be run. For example, a search engine runs focus crawlers for the topics petroleum, music, and technology. Three focus crawlers may crawl the web searching for documents that match the focus criteria. This approach requires adequate administration and manpower to manage those three focus crawlers. In addition, even though these topics seem very different, they may still have some pages or documents in common. For example, each of the focus crawlers may crawl a news website seeking web documents that relate to that topic. This implies that the search engine is searching the same news website three times (once for each focus crawler) each day, for example, searching for out-links of interest to the focus crawler.

Searching the same website for each focus crawler wastes resources for both the search engine and the web site being crawled. This issue is magnified when a search engine operates many hundreds of focus crawlers. What is therefore needed is a system, a service, a computer program product, and an associated method for a focus crawler that can manage multiple focus topics while crawling the Web, minimizing the number of times a web document is crawled and maximizing computing and bandwidth resources of the search engine. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for collaborative focused crawling of documents on a network. Focused crawling is defined as crawling web documents that match a focus topic or set of topics.

There are various reasons to focus a crawl. For example, a focus crawl for a search engine might focus on an intranet and not crawl any documents beyond a firewall. A focus crawl for a data-mining application would obtain all web documents from the web that are related a specified topic such as technology, cooking, computers, etc.

The present system comprises a fetcher and a focus engine. The fetcher prioritizes which documents that the system should crawl based on rules provided. The present system starts the crawl by providing the fetcher with some initial seed URLs. The fetcher obtains the documents from the Internet or network and outputs crawled or fetched documents to the focus engine.

The responsibility of the focus engine is to determine, for each fetched document, whether the document is relevant to any of the multiple focus topics. The focus engine sends instructions to the fetcher, instructing it to crawl a web document that matches any of the focus topics, and to crawl any out-links on that web document on the assumption that if the web document is of interest, most likely the out-links are also of interest. The focus engine may also instruct the fetcher how frequently the web document should be crawled.

The focus engine may also determine whether any of the fetched documents fall within one or more categories for disallowed web documents. If a fetched document is disallowed, the present system may place the URL for that web document in a blacklist, a list of URLs that may not be crawled. A focus topic such as pornography may be designated an "unfocus" topic; any web document that matches that topic may be disallowed. Web documents may also be disallowed if they fail a set of rules designed for a web space focus, for example, domain rules, IP address rules, and prefix rules. Application of these rules can restrict crawling to specific areas in the web space.

The present system conserves resources of both the crawling system and the web sites being crawled because a web document is crawled only once regardless of the number of focus topics maintained by the crawl.

Further, the chances of discovering additional web documents or clusters of web documents relating to a focus topic are greater since relevant documents may be reached from a document belonging to a different focus topic. In addition, the present system can crawl the web for multiple focus topics and still respect the unwritten "rules of the internet" that indicate web sites should not be accessed unnecessarily or excessively since each website is being crawled only once by the present system.

Conventional technology utilizing focused crawling implemented the focus on one web document at a time for one focus topic. The present system performs a collaborative focus, analyzing web documents for more than one focus topic at a time. In addition, the present system may analyze web documents as a group or individually. For example, a set of URL strings representing web documents may be evaluated with respect to a web space focus. The web space focus would then indicate whether a URL string matched predetermined rules for domains, IP addresses or prefixes. Any URL string not meeting the desired criteria would be disallowed and not crawled.

In another embodiment, the present system can analyze a group of web documents obtained by crawling the web. The present system would identify those web documents and graph properties that indicate which of those web documents represent the best sources of information for a specific topic within that group of web documents. This creates a "community" of web documents on the same topic. The present system identifies the web documents that are the source of information, called "hubs", and the authoritative web documents that attract links on a focus topic. These hubs and authoritative web documents may then be the initial web documents from which a focus crawl may begin.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

Focused Crawl: crawling only web documents that are of interest as defined by the crawler.

Internet: A collection of interconnected public and private computer networks that are linked together with routers by a set of standard protocols to form a global, distributed network.

URL (Uniform Resource Locator): A unique address that fully specifies the location of a content object on the Internet. The general format of a URL is protocol://server-address/path/filename.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page may typically refer to other web pages and Internet resources by including hypertext links.

Web site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and comprises the content of a particular organization. Other types of web sites may comprise, for example, a hypertext database of a corporate "intranet" (i.e., an internal network which uses standard Internet protocols), or a site of a hypertext system that uses document retrieval protocols other than those of the WWW.

World Wide Web (WWW, also Web): An Internet client-server hypertext distributed information retrieval system.

Figure 1:
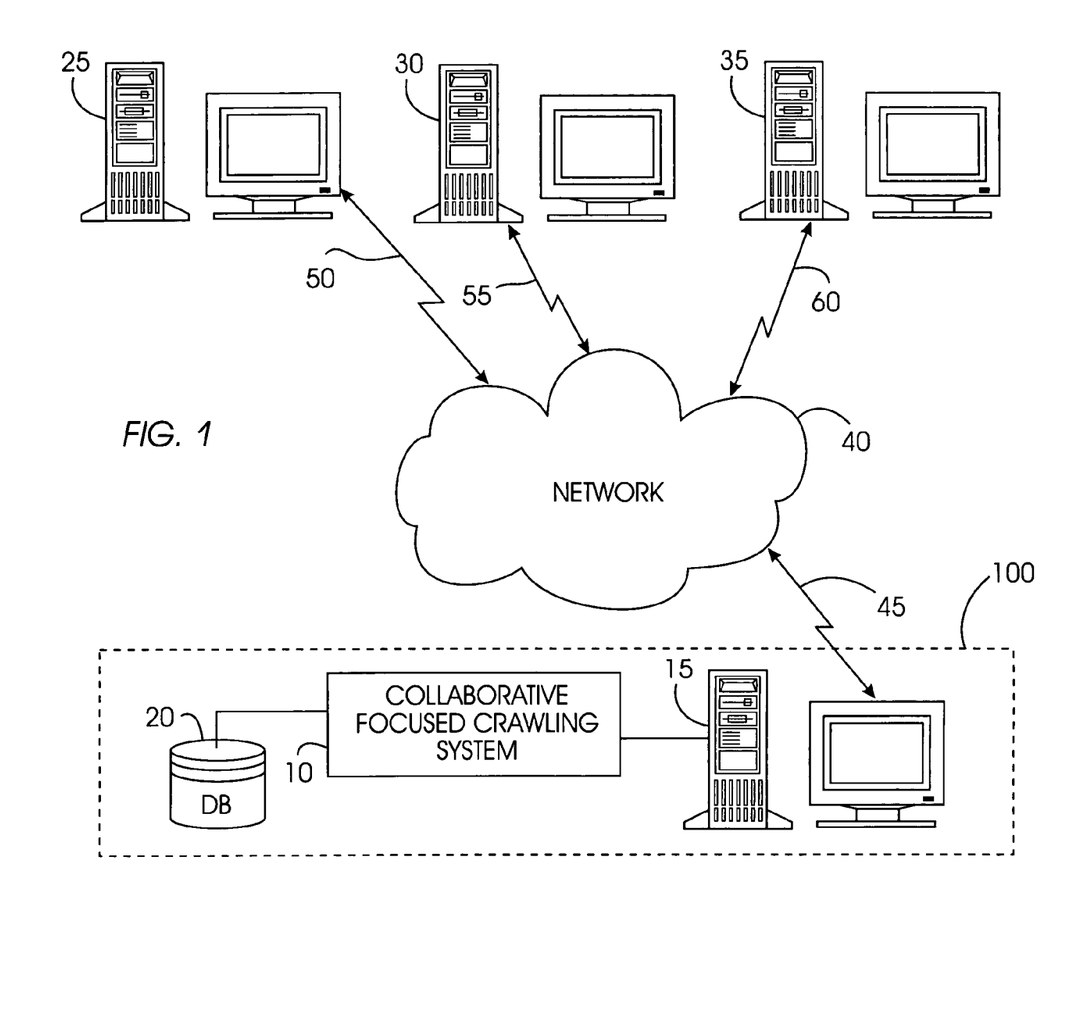
FIG. 1 is a schematic illustration of an exemplary operating environment in which a collaborative focused crawling system of the present invention can be used.

FIG. 1 portrays an exemplary overall environment in which a system, service, and associated method for collaborative focused crawling of documents on a network according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

A web crawler system 100 is comprised of system 10, a host server 15, and a database 20. Web crawler system 100 crawls the web at the direction of system 10. URLs of web documents of interest or web documents to be avoided are optionally stored in database 20. The focused crawling of system 10 may be comprised of, for example, focusing on content on the web document, on URL domain, on URL subnet, on the URL string, or a combination of these.

Web document servers are represented by a variety of computers such as servers 25, 30, 35, and are accessed by the host server 15 through a network 40. The host server 15 is connected to network 40 via a communications link 45 such as a telephone, cable, or satellite link. Servers 25, 30, 35 can be connected to network 40 via communications links 50, 55, 60, respectively. While system 10 is described in terms of network 40, servers 25, 30, 35 may also be accessed by system 10 locally rather than remotely.

Figure 2:
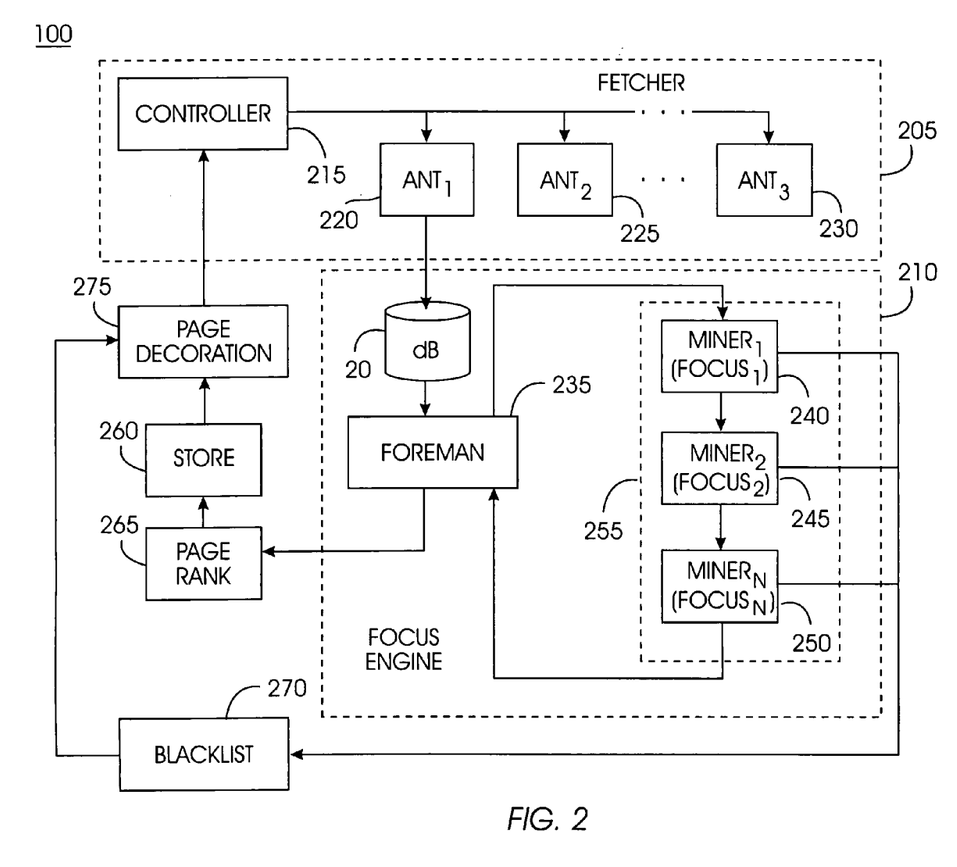
FIG. 2 is a block diagram of the high-level architecture of the collaborative focused crawling system of FIG. 1.

The high-level architecture of system 10 is illustrated by the block diagram of FIG. 2. System 10 comprises a fetcher 205 and a focus engine 210. Fetcher 205 is comprised of a controller 215 and an $Ant_1$ 220, an $Ant_2$ 225, through an $Ant_N$ 230 (collectively referred to as Ants 220, 225, 230). In a distributed crawler, Ants 220, 225, 230 are the devices that crawl and store web pages.

Controller 215 is the component that allocates work for Ants 220, 225, 230 and which routes appropriate URLs to Ants 220, 225, 230. The focus engine 210 comprises database 20, a foreman 235, and a $miner_1$ 240, a $miner_2$ 245, through a $miner_N$ 250 (collectively referenced as miners 255). Each miner 255 represents a focus topic. Additional components of web crawler system 100 are a store 260, a page rank 265, a blacklist 270, and a page decoration 275.

Figure 3:
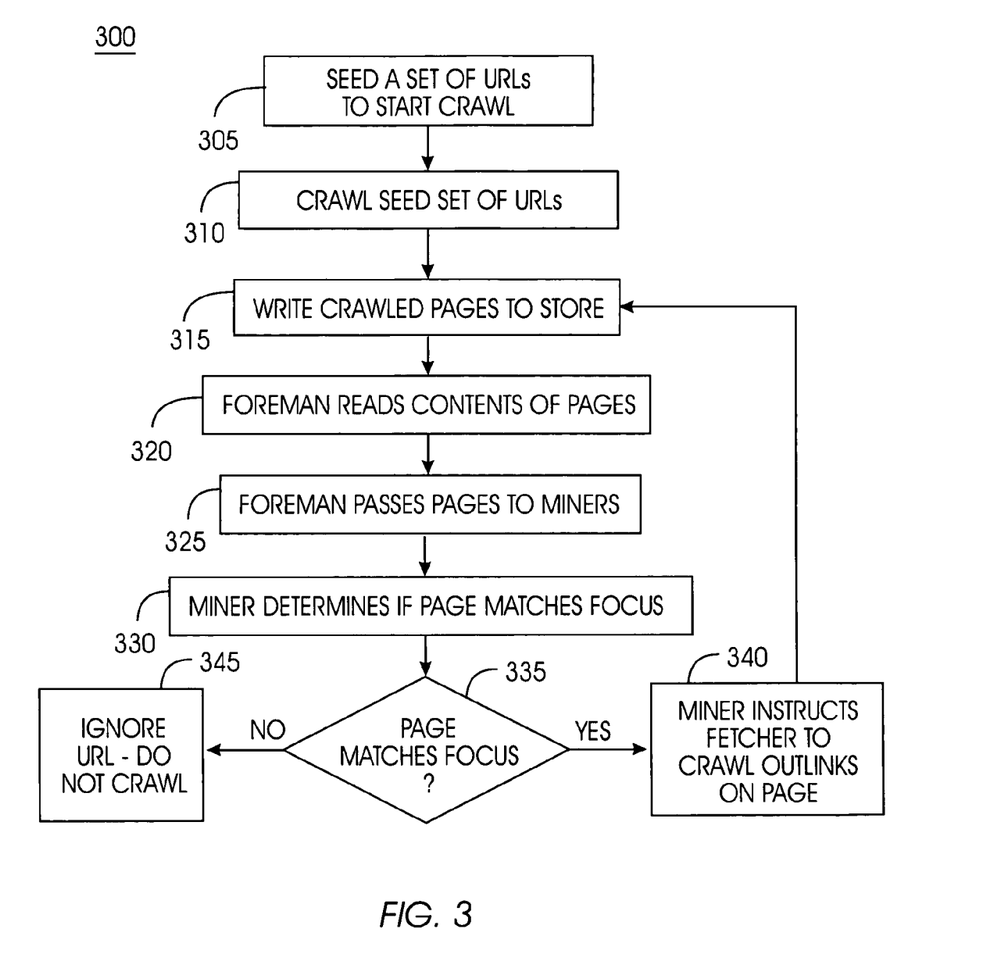
FIG. 3 is a process flow chart illustrating a method of operation of the collaborative focused crawling system of FIGS. 1 and 2.

A method 300 of system 10 using content as a basis for focus crawling is illustrated by the process flow chart of FIG. 3. With content focused crawling, system 10 analyzes the contents of a web document and determines if the out-links of that web document should be followed. System 10 seeds a set of URLs for the web crawler system 100 to start the crawl at block 305. The web crawler system 100 crawls web documents for those URLs at block 310 and writes the contents of those URLS (Web documents) to store 260 at block 315.

Foreman 235 reads the contents of the web document at block 320 and passes the web document to miners 255 at block 325. Foreman 235 can be configured with a variable number of miners 255. For each configured miner 255, foreman 235 forks and runs a child process.

Miners 255 determine whether the web documents match their specific focus at block 330. If system 10 comprises more than one focus, the web document is sequentially passed to each miner. If at decision block 335 the web document matches the focus of any miner 255 without being disallowed, focus engine 210 instructs fetcher 205 to crawl the out-links on that web document. If at decision block 335 the web document does not match the focus of any focus miner 355, the URL is ignored at block 345 and not crawled. System 10 then repeats blocks 315 through 345 for the out-links of any web documents selected for additional crawling.

Fetcher 205 prioritizes which documents that the web crawler system 100 should crawl based on rules provided by system 10. The fetcher 205 obtains the documents from the Internet or network. The output of the fetcher is crawled or fetched documents.

Fetched documents are transferred to the focus engine 210. The focus engine 210 determines whether the fetched web document is relevant to any of the focus topics represented by miners 255. If the fetched web document is relevant, the focus engine 210 requests fetcher 205 to crawl the out-links on the fetched web document on the assumption that a relevant web document may have links to additional web documents relevant to the focus topic. The focus engine 210 may also instruct fetcher 205 the frequency at which the fetched web document should be crawled. A feature of system 10 is that the out-links of the fetched web document are not crawled before the relevance of the fetched web document is determined. Conventional focus crawlers would crawl the out-links first to determine the subject of the document. By determining the relevance of the document before crawling the out-links, system 10 reduces the number of irrelevant web documents crawled by the web crawler system 100, conserving resources and bandwidth.

A fetched web document that has been identified as relevant to a focus topic is "decorated" by the page decoration 275. The page decoration 275 decorates a URL with an opaque data structure that is not interpreted by the web crawler system 100. This data structure comprises information such as, for example, page rank. In one embodiment, page rank may be used by miners 255 to determine the importance of a link. Documents obtained by fetcher 205 are analyzed by page rank 265 to determine their rank with respect to the relevant topic. Page rank is aggregated from multiple web documents and may be generated by page rank 265 through batch processing of one or more focus crawls. Information provided in the page decoration may be used by miners 255 to select URLs relevant to their topic.

Once a document has been fetched and decorated, system 10 determines whether the fetched document is actually of interest to the specified topic. For example, $miner_1$ 240 might pertain to a focus of health. A web document fetched by fetcher 205 is decorated with a health designation. Miner₁ 240 examines the web document and determines that it does not pertain to health. Consequently, system 10 adjusts the algorithm for focusing and requests fetcher 205 to stop fetching that web document.

If a focus topic is not desired, a miner 255 may be designated to unfocus on that topic. The URL for any web documents found that pertain to that topic may be placed in blacklist 265. One topic that may be designated as an unfocus topic might be pornography.

Additional URLs for fetched web documents that don't match any focus topic are ignored. If a URL is blacklisted, it is never crawled again. If a URL is ignored, it means at this stage that system 10 did not find anything useful from that URL, but the URL may be crawled in the future.

The focus engine 210 instructs fetcher 205 to crawl the out-links. The focus engine 210 may inform fetcher 205 why those out-links are to be crawled. Consequently, when web documents corresponding to those out-links are returned, system 10 can determine whether those web documents are relevant to the intended focus.

Figure 4:
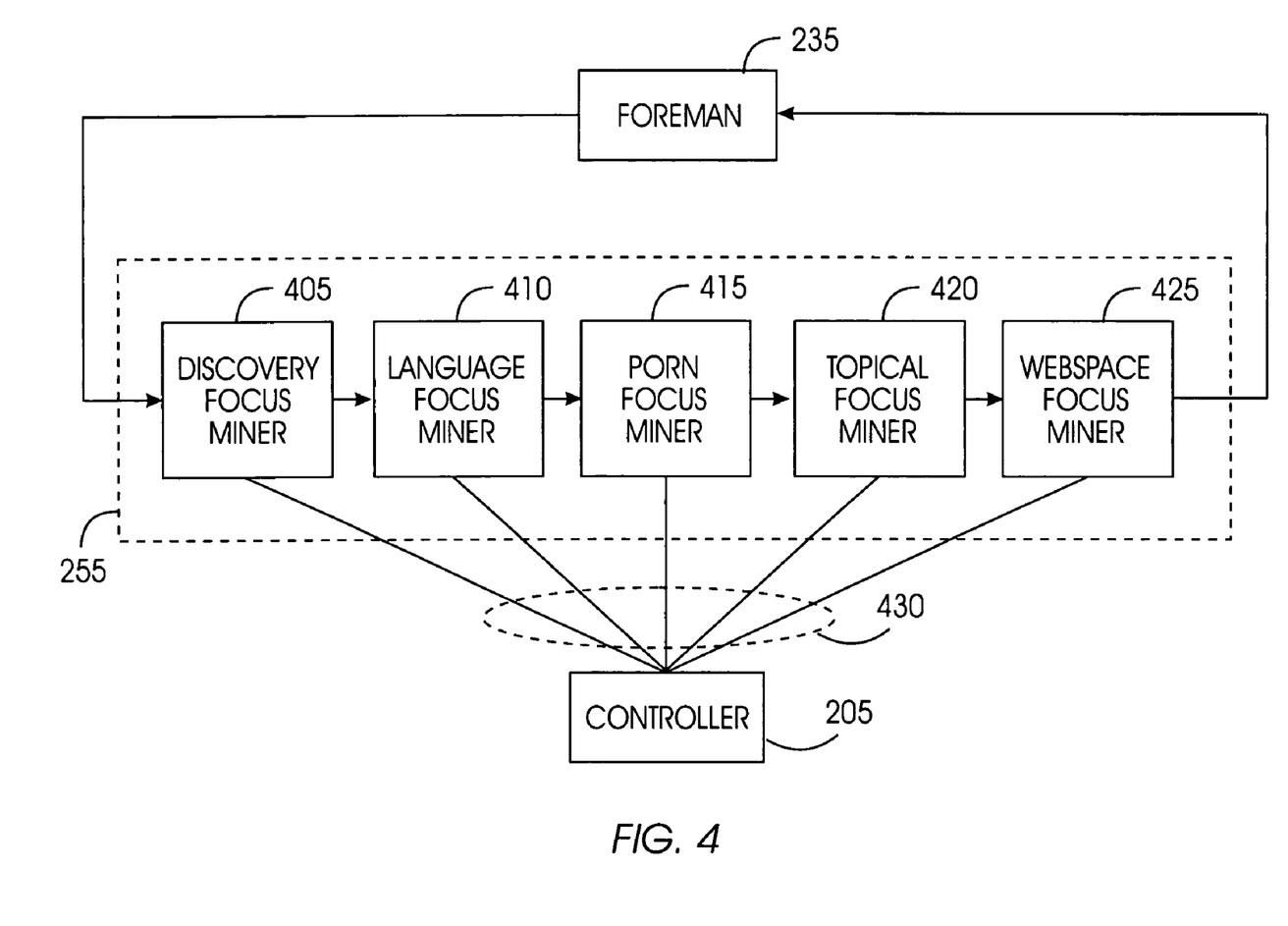
FIG. 4 is a block diagram further illustrating the focus miners of the of the collaborative focused crawling system of FIGS. 1 and 2.

The block diagram of FIG. 4 further illustrates an exemplary group of miners 255. For example, miners 255 might comprise a discovery focus miner 405, a language focus miner 410, a porn unfocus miner 415, a topical focus miner 420, and a web space focus miner 425. Miners 255 examine the contents of a web document and determine which extracted URLs are to be crawled by fetcher 205. URLs requested by miners 255 are queued. Any number of miners 255 may be used by system 10. Each miner 255 communicates individually with the web crawler system 100 and passes messages to queue URLs or domains for crawling or blacklist URLs or domains. Crawl control commands 430 are issued from controller 205 to miners 255.

The discovery focus miner 405 randomly selects a URL from some random web document. The discovery focus miner 405 can thus discover new documents that might contain topics of interest that might otherwise not be discovered. The language focus miner 410 determines the language of a web document and determines whether URLs on that document need to be crawled. The language focus miner 405 is used by system 10 to train the discovery focus miner 410.

Figure 5:
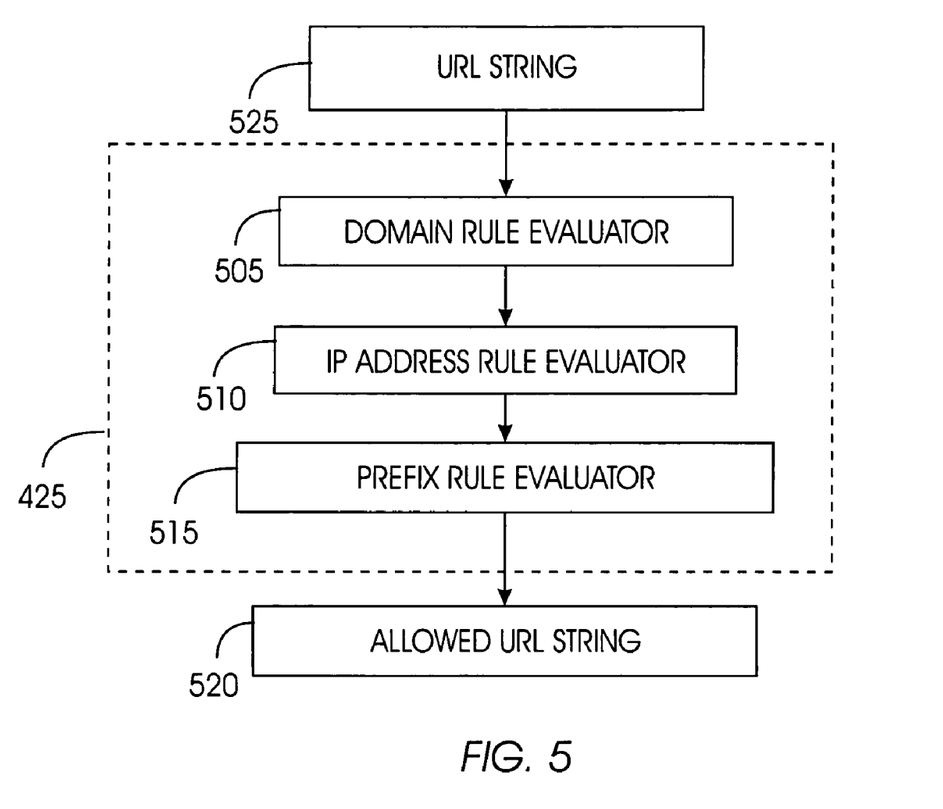
FIG. 5 is a block diagram further illustrating a web space focus miner of the of the collaborative focused crawling system of FIGS. 1 and 2.

As illustrated by FIG. 5, the web space focus miner 425 comprises a set of rules evaluators that determine whether a URL string is qualified for crawling based on web space rules. Exemplary rules evaluators are a domain rule evaluator 505, an IP address rule evaluator 510, and a prefix rule evaluator 515. Input to the web space focus miner 425 is a URL string 520; output from the web space focus miner is an allowed URL string 525.

The domain rule evaluator 505, the IP address rule evaluator 510, and the prefix rule evaluator 515 each comprise one or more rules for determining whether a URL may be crawled. Web space rules control the web space that the web crawler system 100 is allowed to crawl, allowing a system administrator to limit the crawling function, for example, to an intranet. In addition, web space rules may be used to prevent web crawler system 100 from crawling beyond a firewall. Rules are evaluated sequentially in the domain rule evaluator 505, the IP address rule evaluator 510, and the prefix rule evaluator 515. If any rule applies to the URL string 525, the URL string 525 is disallowed and evaluation of the URL string 525 stops. If no matching rules are found for the URL string 525, the URL string 525 is allowed, as indicated by the output of the web space focus miner 425, allowed URL string 520.

Figure 6A:
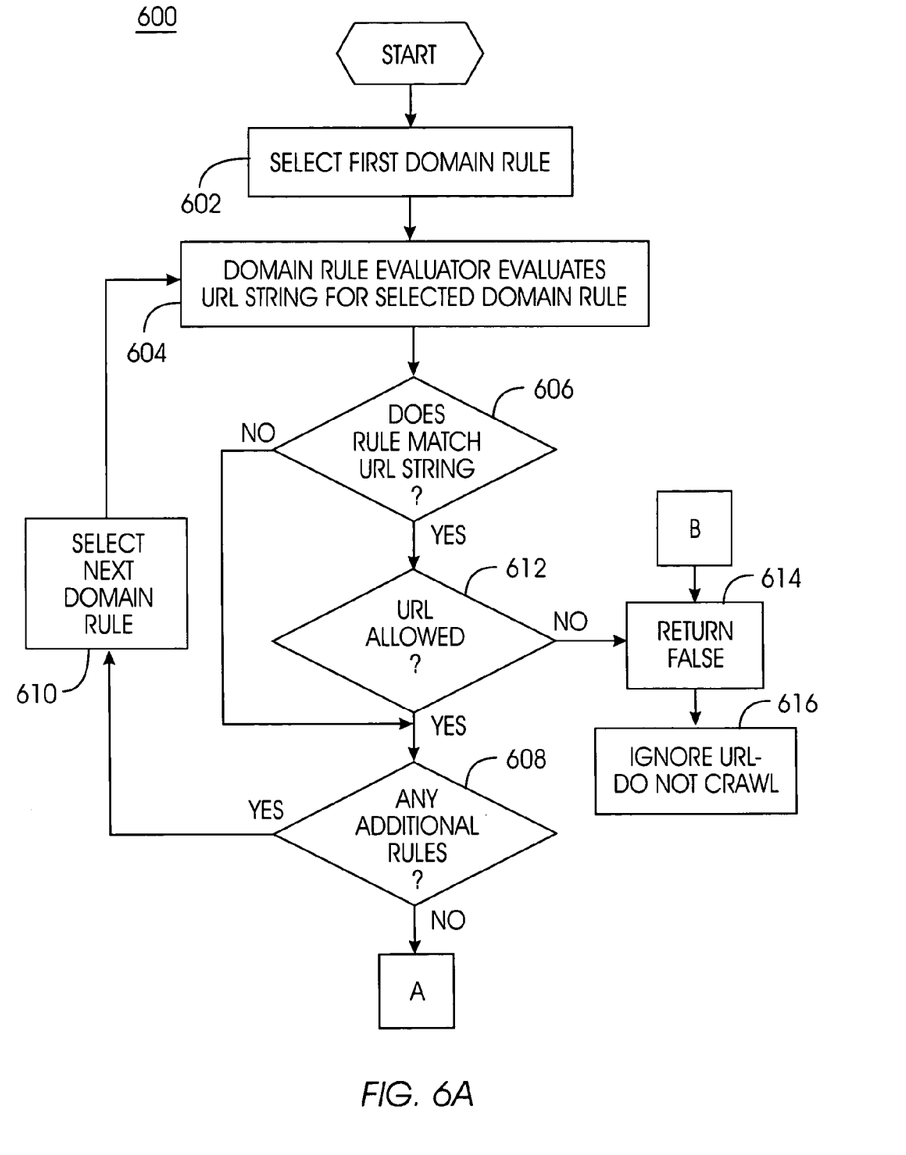
FIG. 6 is comprised of FIGS. 6A, 6B, and 6C and is a process flow chart illustrating a method of operation of the web space focus miner of the collaborative focused crawling system of FIGS. 1 and 2.
Figure 6B:
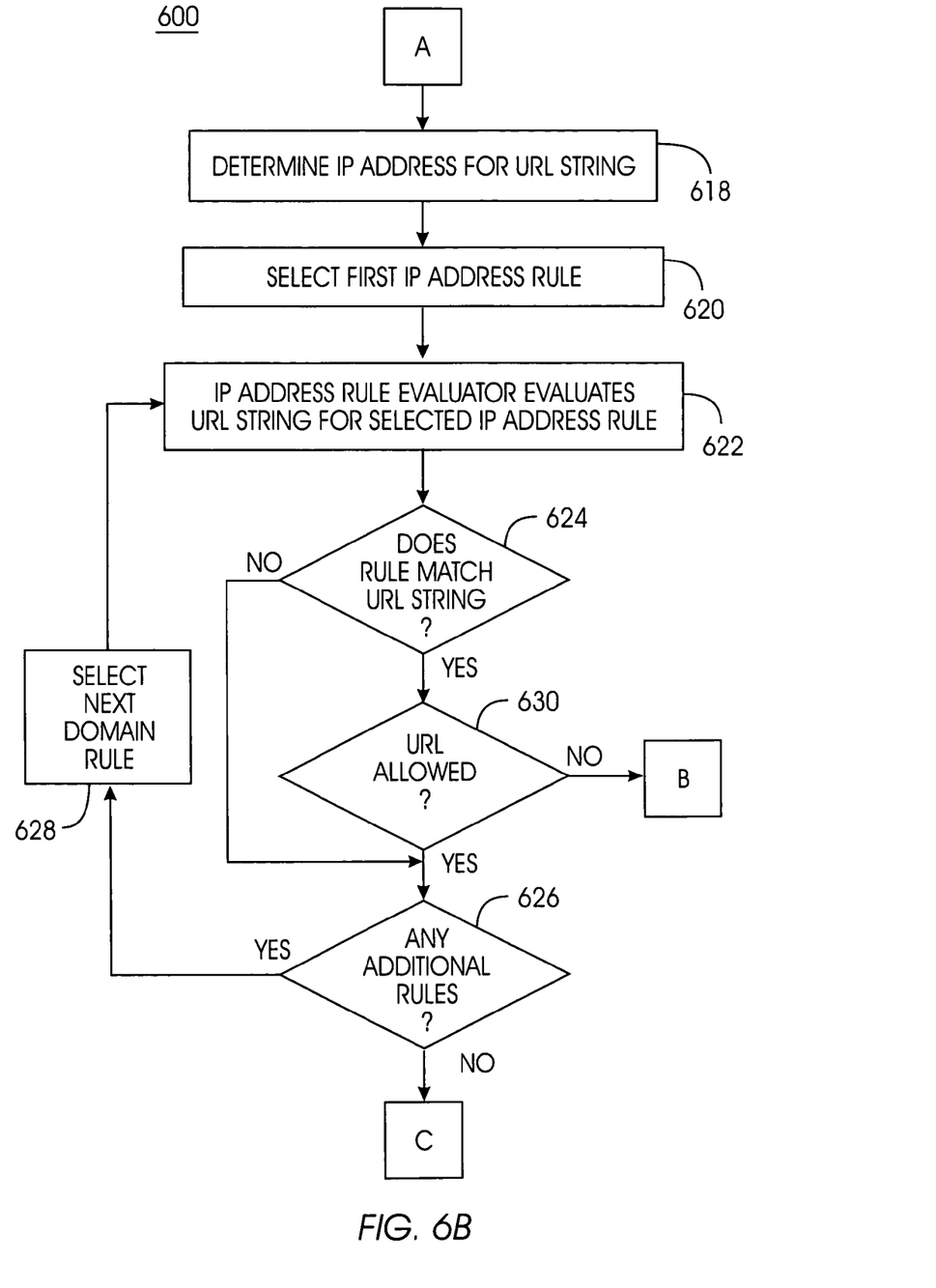
Figure 6C:
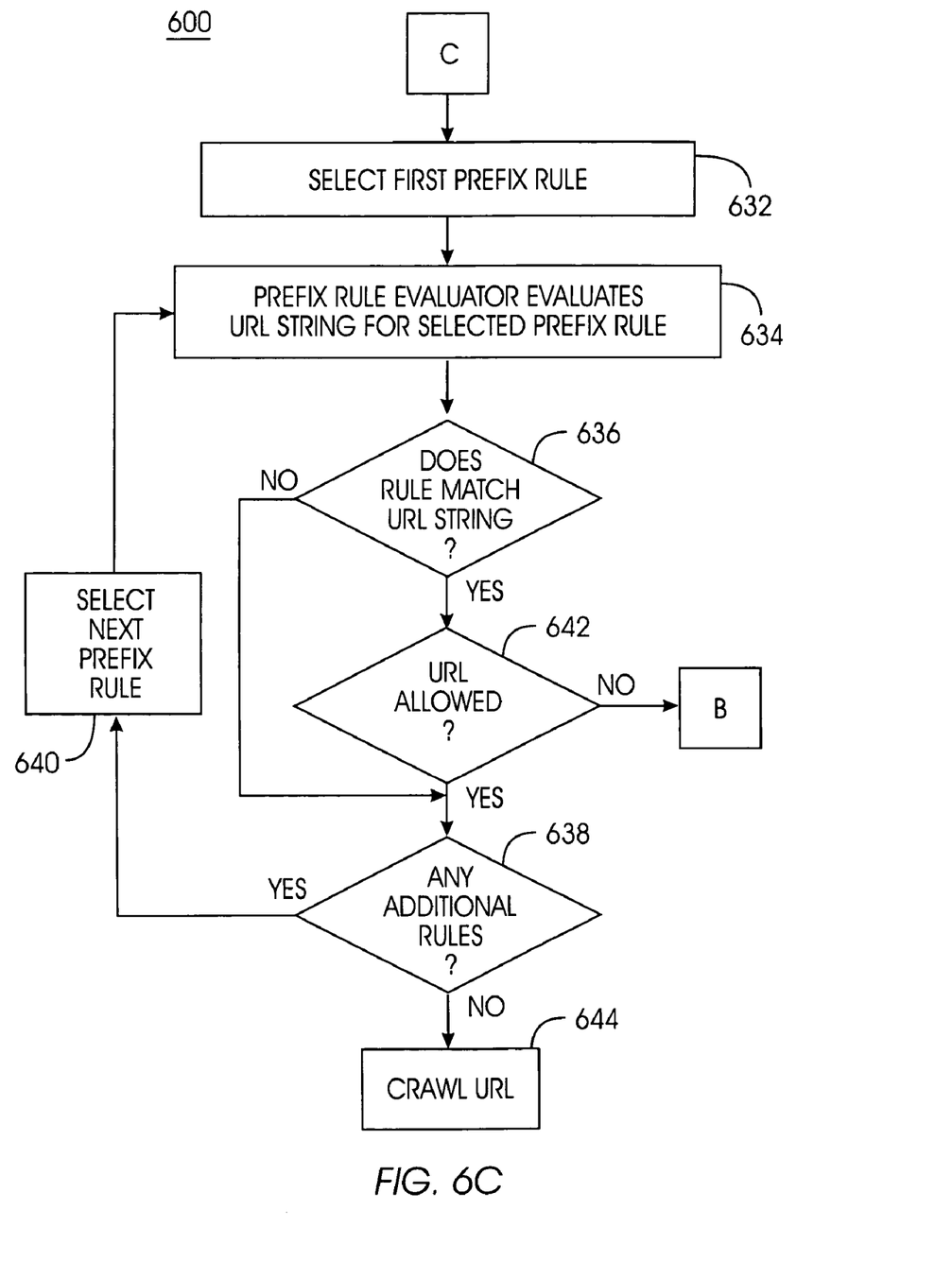

A method 600 for evaluating the URL string 525 based on web space rules is illustrated by the process flow chart of FIG. 6 (FIGS. 6A, 6B, 6C). At block 602, system 10 selects a first domain rule for comparison with the URL string 525. At block 604, the domain rule evaluator 505 compares the URL string 525 with the selected domain rule. The domain rule evaluator 505 compares the URL string 525 to domains that are explicitly allowed or disallowed. For example, the following rule states that the web crawler system 100 is allowed to crawl www.ibm.com during all hours of the day:

allow domain www.ibm.com <0 86400>

Another rule might state that the web crawler system 100 is not allowed to crawl www.pornsite.com at any time of the day:

disallow domain www.pornsite.com <0 86400>

Wildcard patterns such as "*" may be used on the domain rule. For example, the web crawler system 100 may be allowed to crawl all sites ending with .ibm.com:

allow domain *.ibm.com <0 86500>

If the selected domain rule does not match or apply to the URL string 525 at decision block 606, the domain rule evaluator 505 determines whether there are any additional rules for evaluation at decision block 608. If additional rules remain for evaluation, the domain rule evaluator 505 selects the next domain rule at bock 610 and proceeds to block 604.

If at decision block 606 the domain rule does match the URL string 525, the domain rule evaluator 505 determines at decision block 612 whether the URL string 525 is allowed by the selected domain rule. If no, the domain rule evaluator 505 returns "false" to system 10 at block 614 and the URL string 525 is ignored at block 616 such that the URL string 525 and its out-links are not crawled.

If the URL string 525 is allowed by the current domain rule at decision block 612, the domain rule evaluator 505 determines if there are any additional rules for evaluation at decision block 608. If additional rules remain for evaluation, the domain rule evaluator 505 selects the next domain rule at bock 610 and proceeds to block 604. If no additional rules remain for evaluation at decision block 608, the URL string 525 is allowed by the domain rule evaluator 505 and is passed to the IP address rule evaluator 510 (FIG. 6B).

The IP address rule evaluator 510 determines the IP address for the URL string 525 at block 618 and selects a first IP address rule at block 620. At block 622, the IP address rule evaluator 520 evaluates the URL string 525 for the selected IP address rule. IP address rules state which IP addresses are allowed or disallowed. For example, an IP address is disallowed by the following rule:

Forbid address 32.71.102.0 255.255.255.0<0 86400>

This rule disallows all domains beginning with IP address "32.71.102". The first dotted notation (32.71.102.0) in the rule is the actual subnet address that is disallowed. The second dotted notation (255.255.255.0) represents a subnet mask that may be applied over the disallowed subnet address before evaluations are made. Other optional rules may specify the hours of the day when this rule is valid.

If at decision block 624 the selected IP address rule does not match or apply to the URL string 525, the IP address rule evaluator 510 determines if there are any additional rules for evaluation at decision block 626. If additional rules remain for evaluation, the IP address rule evaluator 510 selects the next IP address rule at bock 628 and proceeds to block 622.

If the IP address rule does match the URL string 525 at decision block 624, the IP address rule evaluator 510 determines at decision block 630 whether the URL string 525 is allowed by the selected IP address rule. If no, the IP address rule evaluator 510 proceeds to block 614 (FIG. 6A) and processes the URL string 525 as before.

If the URL string 525 is allowed by the current IP address rule at decision block 630, the IP address rule evaluator 510 determines if there are any additional rules for evaluation at decision block 626. If additional rules remain for evaluation, the IP address rule evaluator 510 selects the next IP address rule at bock 628 and proceeds to block 622. If no additional rules remain for evaluation at decision block 608, the URL string 525 is allowed by the IP address rule evaluator 510 and is passed to the prefix rule evaluator 515 (FIG. 6C).

The prefix rule evaluator selects a first prefix rule at block 632 and evaluates the URL string 525 for that selected prefix rule at block 634. To narrow and focus the crawl, prefix rules specify which URL prefixes that the web crawler system 100 is not allowed to crawl. Prefix rules might be, for example:

Forbid prefix http://www.yahoo.com/calendar <0 86400>
Allow prefix http://www.yahoo.com/ <0 86400>

These two prefix rules restrict the web crawler system 100 to crawl everything under site "http://www.yahoo.com/" except the directory "calendar", assuming that the site "www.yahoo.com" has passed both the domain rule evaluator 505 and the IP address rule evaluator 510.

If at decision block 636 the selected prefix rule does not match or apply to the URL string 525, the prefix rule evaluator 515 determines whether there are any additional rules for evaluation at decision block 638. If additional rules remain for evaluation, the prefix rule evaluator 515 selects the next prefix rule at bock 640 and proceeds to block 634.

If the prefix rule does match the URL string 525 at decision block 636, the prefix rule evaluator 515 determines at decision block 642 whether the URL string 525 is allowed by the selected prefix rule. If no, the prefix rule evaluator 515 proceeds to block 614 (FIG. 6A) and processes the URL string 525 as before.

If the URL string 525 is allowed by the current prefix rule at decision block 642, the prefix rule evaluator 515 determines whether there are any additional rules for evaluation at decision block 638. If additional rules remain for evaluation, the prefix rule evaluator 515 selects the next prefix rule at bock 640 and proceeds to block 634. If no additional rules remain for evaluation at decision block 638, the URL string 525 is allowed by the web space focus miner 425 and may be crawled at block 644. The web space focus miner 425 evaluates the URL string 525 after all the other miners 255 have evaluated the URL string 525.

In another embodiment, crawls are focused by aggregating information from multiple web documents in a single focus crawl or multiple focus crawls. System 10 focuses the crawl based on the data derived from analysis of the aggregation of the web documents. In this embodiment, system 10 computes "hubs" and "authorities" for web documents collected by miner 255. Authority documents contain authoritative information that attracts links from other web documents or documents. Hub documents are starting points for finding new authority documents.

Figure 7:
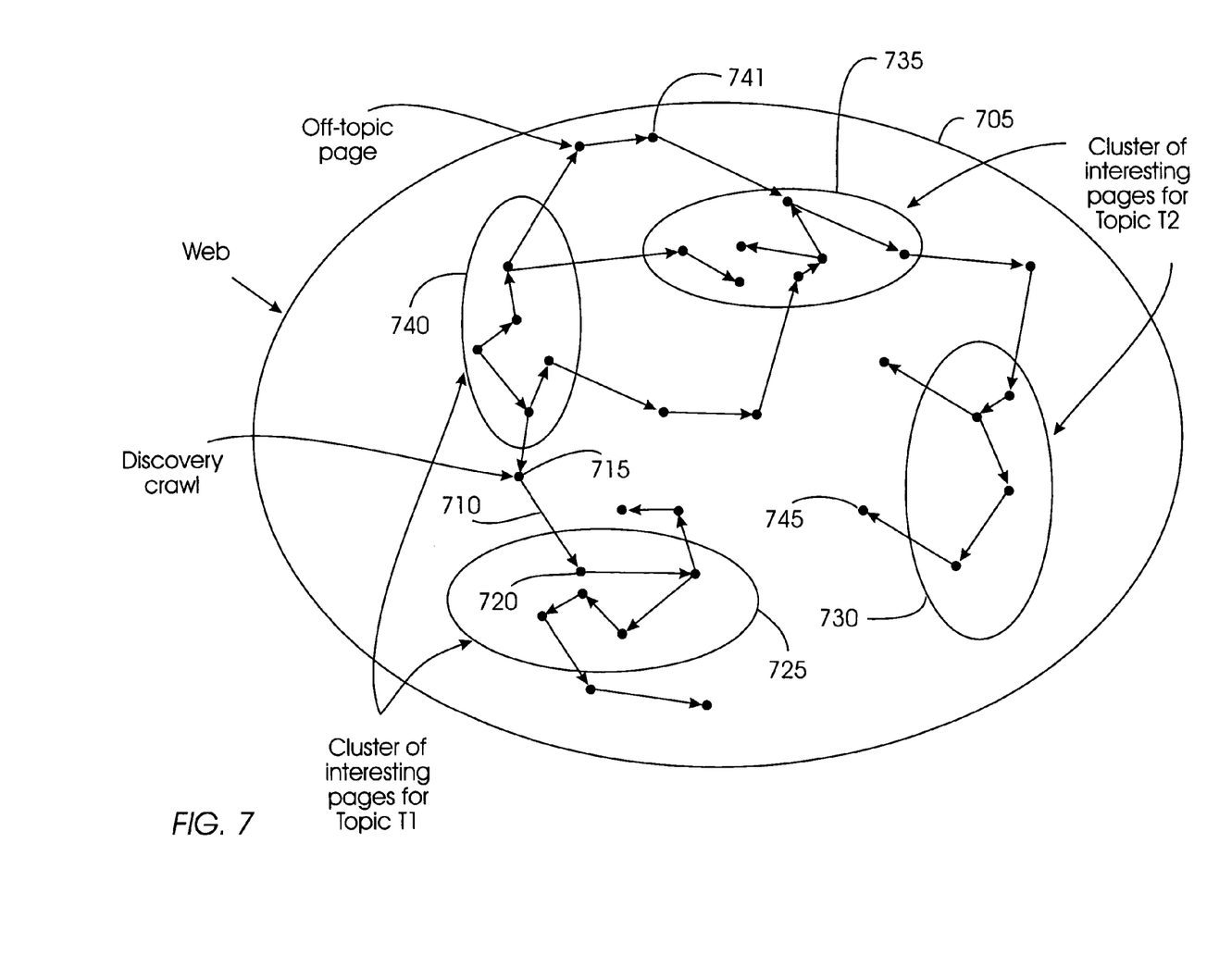
FIG. 7 is a diagram illustrating an embodiment of the collaborative focused crawling system of FIGS. 1 and 2 utilizing multiple focus crawls and discovery crawls.

FIG. 7 illustrates a map of the discovery of hub documents and authority documents within a crawl. Documents are crawled on a web 705 by the web crawler system 100. A discovery crawl 710 is performed by the web crawler system 100. The discovery crawl 710 is represented as a series of lines showing navigation from, for example, web document A, 715, to web document B, 720. Web documents are represented by small circles such as those for web document A, 715, and web document B, 720.

As the discovery crawl 710 navigates through web documents, web documents with a similar focus may be found "close" together in that a web document that matches a focus may likely have out-links that match the focus. These web documents matching a particular focus may be represented by clusters 725, 730, 735, 740. As web crawler system 100 crawls through the out-links of an authoritative web document or hub, a web document may be found that does not match the focus, as represented by off-topic web documents 741, 745. A hub can be designated by a ranking system that determines which sites possess high quality pages.

It is to be understood that the specific embodiments of the invention that have been described are merely illustrative of certain applications of the principle of the present invention. Numerous modifications may be made to the system, method, and service for collaborative focused crawling of documents on a network invention described herein without departing from the spirit and scope of the present invention. Moreover, while the present invention is described for illustration purpose only in relation to the WWW, it should be clear that the invention is applicable as well to, for example, an local area network, a wide area network, or any other collection of computers networked together to share information.

What is claimed is:

1. A processor-implemented method of collaborative focused crawling of documents related to focus topics on a network, the method comprising:

selectively prioritizing the documents to crawl based on a set of rules;

fetching prioritized documents from the network;

for each fetched document, determining whether the fetched document is relevant to any of the focus topics;

crawling the fetched document that matches any of the focus topics such that the fetched document is crawled only once even if the fetched document matches a plurality of the focus topics, wherein the fetched document comprises a document of interest for access by a user;

further crawling out-links on the fetched document based on an assumption that if the fetched document is of interest, the out-links are also of interest; determining whether the fetched document should be disallowed, and upon determination that the fetched document should be disallowed:

selectively disallowing the fetched document;

identifying a resource locator string associated with the disallowed fetched document;

placing the resource locator string for the disallowed fetched document in a blacklist in order to prevent future crawling of the fetched document;

wherein the crawling is performed using a collaborative focus by analyzing the documents for more than one focus topic of the focus topics at a time by implementing a foreman function for reading a plurality of contents of the resulting uniform resource locator strings, and sequentially passing the contents of the resulting uniform resource locator strings to a plurality of sequentially configured miners that each represent an individual focus topic, wherein each miner is configured to insruct a fetcher to crawl a plurality of out-links on a document of the resulting resource locator string whenever the contents of the resulting resource locator string match the specific focus topic of the miner, and wherein each miner is configured to ignore the resulting resource locator string whenever the contents of the resulting resource locator string do not match the specific focus of the miner; and analyzing a plurality of fetched documents obtained from the crawling by providing a graphical indicia of one or more properties that are indicative of which of the plurality of fetched documents represent a best source of information for a specific topic within the plurality of fetched documents.

2. The method of claim 1, further comprising seeding a plurality of seed uniform resource locator strings to start the collaborative focused crawling of the documents.

3. The method of claim 2, further comprising crawling the seed uniform resource locator strings.

4. The method of claim 3, further comprising writing a plurality of resulting uniform resource locator strings obtained by crawling the seed uniform resource locator strings.

5. The method of claim 1, wherein each miner is individually configured to allow a crawling of the resulting resource locator string when the resulting resource locator string matches a plurality of web space rules.

6. The method of claim 5, wherein the web space rules comprise domain rules, IP address rules, and prefix rules.

7. The method of claim 5, further comprising the plurality of miners collectively disallowing the crawling of the resulting resource locator string when the content of the resulting resource locator string fails to match any of the focus topics of the miners.

8. The method of claim 5, wherein at least one of the miners comprises an unfocus miner that places the resulting uniform resource locator strings that match an unfocus topic in the blacklist, so that the uniform resource locator strings will not be crawled again.

* * * * *